United States Patent
Chun et al.

(10) Patent No.: US 10,021,722 B2
(45) Date of Patent: Jul. 10, 2018

(54) METHOD AND DEVICE FOR RECEIVING FRAME IN WIRELESS LAN

(71) Applicant: LG ELECTRONICS INC., Seoul (KR)

(72) Inventors: Jinyoung Chun, Seoul (KR); Wookbong Lee, Seoul (KR); Jinsoo Choi, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/317,089

(22) PCT Filed: Apr. 27, 2015

(86) PCT No.: PCT/KR2015/004178
§ 371 (c)(1),
(2) Date: Dec. 7, 2016

(87) PCT Pub. No.: WO2015/190697
PCT Pub. Date: Dec. 17, 2015

(65) Prior Publication Data
US 2017/0127451 A1    May 4, 2017

Related U.S. Application Data

(60) Provisional application No. 62/009,318, filed on Jun. 8, 2014, provisional application No. 62/012,985, filed on Jun. 17, 2014.

(51) Int. Cl.
*H04W 4/00* (2018.01)
*H04W 74/08* (2009.01)
(Continued)

(52) U.S. Cl.
CPC .......... *H04W 74/0825* (2013.01); *H04J 4/00* (2013.01); *H04J 13/18* (2013.01);
(Continued)

(58) Field of Classification Search
CPC ......... H04W 74/0825; H04W 72/0446; H04W 72/0453; H04W 72/1284; H04W 84/12; H04J 4/00; H04J 13/18
(Continued)

(56) References Cited

U.S. PATENT DOCUMENTS

2004/0204105 A1* 10/2004 Liang ................... H04B 7/0608
455/562.1
2005/0165946 A1* 7/2005 Stephens ............... H04W 28/26
709/233
(Continued)

FOREIGN PATENT DOCUMENTS

JP    2013219687 A    10/2013
KR    1020080083146 A    9/2008
(Continued)

OTHER PUBLICATIONS

"IEEE P802.11-REVmc™/D2.0, Oct. 2013 Draft Standard for Information technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE P802.11-REVmc™/D2.0, Oct. 2013, section 8.3.1.2.- 8.3.1.3., pp. 533-534 (3 pages provided).
(Continued)

*Primary Examiner* — Peter Cheng
(74) *Attorney, Agent, or Firm* — Lee Hong Degerman Kang Waimey

(57) ABSTRACT

Disclosed are a method and a device for receiving a frame in a wireless LAN. A method for receiving a frame in a
(Continued)

wireless LAN comprises the steps of: an AP transmitting an RTS frame to a plurality of STAs, wherein the RTS frame comprises information for NAV setting of an STA other than the plurality of STAs; the AP receiving from each of the plurality of STAs, as a response to the RTS frame, a CTS PPDU and an additional CTS PPDU on overlapped time resources; and the AP transmitting an uplink transmission indication frame to the plurality of STAs, wherein the uplink transmission indication frame triggers transmission of an uplink frame of each of the plurality of STAs.

6 Claims, 13 Drawing Sheets

(51) Int. Cl.
*H04W 72/12* (2009.01)
*H04W 72/04* (2009.01)
*H04J 13/18* (2011.01)
*H04J 4/00* (2006.01)
*H04W 84/12* (2009.01)

(52) U.S. Cl.
CPC ... *H04W 72/0446* (2013.01); *H04W 72/0453* (2013.01); *H04W 72/1284* (2013.01); *H04W 84/12* (2013.01)

(58) Field of Classification Search
USPC .......................................................... 370/329
See application file for complete search history.

(56) References Cited

U.S. PATENT DOCUMENTS

| 2007/0133447 | A1 | 6/2007 | Wentink |
| 2012/0236840 | A1 | 9/2012 | Kim et al. |
| 2012/0327915 | A1* | 12/2012 | Kang ............... H04L 5/0007 370/336 |
| 2015/0236766 | A1* | 8/2015 | Papadopoulos ...... H04B 7/0452 370/329 |
| 2016/0338105 | A1* | 11/2016 | Wu ............... H04W 74/0816 |

FOREIGN PATENT DOCUMENTS

| KR | 1020110058710 A | 6/2011 |
| WO | 2011108832 A2 | 9/2011 |
| WO | 2013028627 A1 | 2/2013 |

OTHER PUBLICATIONS

PCT International Application No. PCT/KR2015/004178, International Search Report dated Jul. 30, 2015, 2 pages.

* cited by examiner

FIG. 1
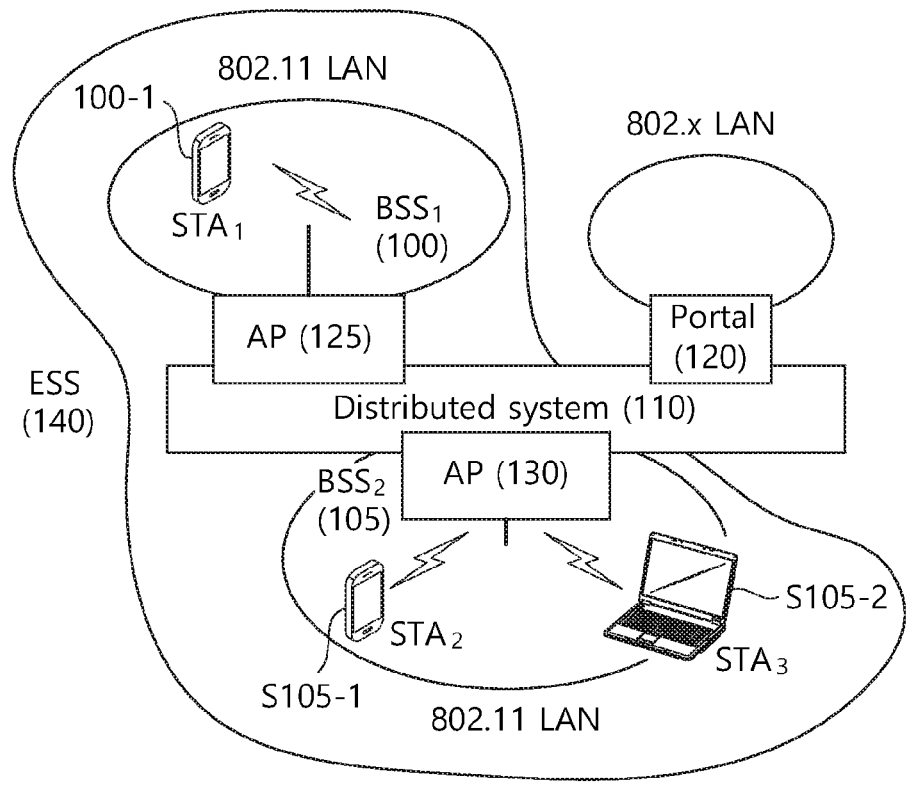
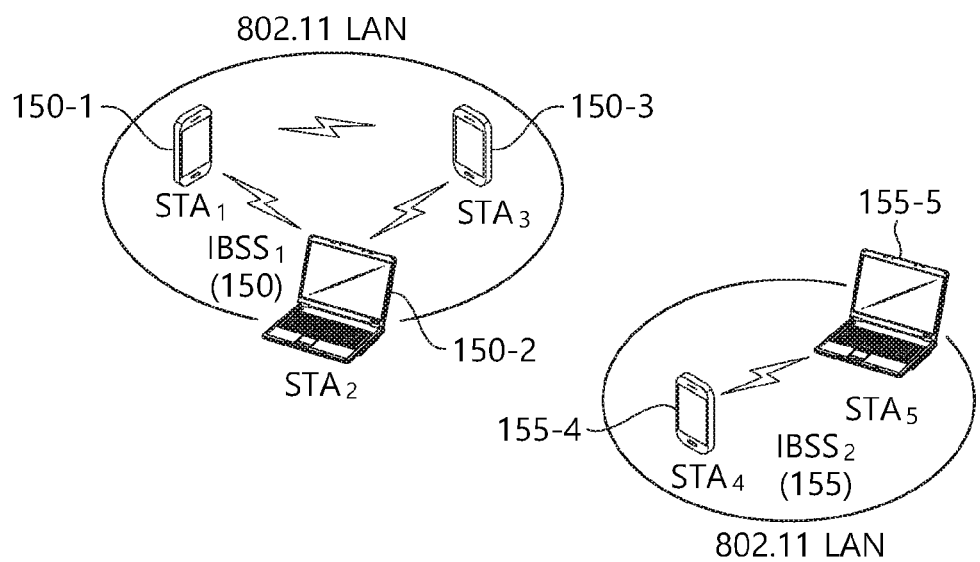

METHOD AND DEVICE FOR RECEIVING FRAME IN WIRELESS LAN

CROSS-REFERENCE TO RELATED APPLICATIONS

This application is the National Stage filing under 35 U.S.C. 371 of International Application No. PCT/KR2015/004178, filed on Apr. 27, 2015, which claims the benefit of U.S. Provisional Applications No. 62/009,318, filed on Jun. 8, 2014 and 62/012,985, filed on Jun. 17, 2014, the contents of which are all hereby incorporated by reference herein in their entirety.

BACKGROUND OF THE INVENTION

Field of the Invention

The present invention relates to wireless communication and, more particularly, to a method and apparatus for receiving a frame in a WLAN.

Related Art

In a wireless local area network (WLAN) system, a distributed coordination function (DCF) may be used as a method enabling a plurality of stations (STAs) to share a wireless medium. The DCF is based on a carrier sensing multiple access with collision avoidance (CSMA/CA).

Generally, in operations under a DCF access environment, when a medium is not occupied (i.e., idle) for a DCF interframe space (DIFS) interval or longer, an STA may send a medium access control (MAC) protocol data unit (MPDU) whose transmission is imminent. When the medium is determined to be occupied according to a carrier sensing mechanism, an STA may determine the size of a contention window (CW) using a random backoff algorithm and perform a backoff procedure. The STA may select a random value in the CW to perform the backoff procedure, and may determine a backoff time based on the selected random value.

When a plurality of STAs attempts to access a medium, an STA that belongs to the STAs and has the shortest backoff time is allowed to access the medium and the other STAs may suspend the remaining backoff time and wait until the STA that has accessed the medium terminates its transmission. When the STA that has accessed the medium terminates the frame transmission, the other STAs contend again with the remaining backoff times to obtain a transmission resource. As described above, in the existing WLAN system, one STA occupies all of transmission resources through one channel in order to send/receive a frame to/from an AP.

SUMMARY OF THE INVENTION

An object of the present invention is to provide a method for receiving a frame in a WLAN.

Another object of the present invention is to provide an apparatus for performing a method for receiving a frame in a WLAN.

A method for receiving a frame in a WLAN according to an aspect of the present invention for achieving the object includes the steps of sending, by an access point (AP), a request to send (RTS) frame to a plurality of stations (STAs), the RTS frame including information for setting a network allocation vector (NAV) of another STA other than the plurality of STAs, receiving, by the AP, a clear to send (CTS) physical layer protocol data unit (PPDU) and an addition CTS PPDU on overlapped time resources from each of the plurality of STAs as a response to the RTS frame, sending, by the AP, an UL transmission indication frame to the plurality of STAs, the UL transmission indication frame triggering the transmission of an UL frame of each of the plurality of STAs, and receiving, by the AP, the UL frame on overlapped time resources from each of the plurality of STAs. The additional CTS PPDU may include a training field, and the UL transmission indication frame may include scheduling information of the UL frame determined based on the training field.

An AP receiving a frame in a WLAN according to another aspect of the present invention for achieving the object includes a radio frequency (RF) unit implemented to send and receive a radio signal and a processor operatively connected to the RF unit. The processor may be implemented to send a request to send (RTS) frame to a plurality of stations (STAs), the RTS frame including information for setting a network allocation vector (NAV) of another STA other than the plurality of STAs, receive a clear to send (CTS) physical layer protocol data unit (PPDU) and an addition CTS PPDU on overlapped time resources from each of the plurality of STAs as a response to the RTS frame, send an UL transmission indication frame to the plurality of STAs, the UL transmission indication frame triggering the transmission of an UL frame of each of the plurality of STAs, and receive the UL frame on overlapped time resources from each of the plurality of STAs. The additional CTS PPDU may include a training field, and the UL transmission indication frame may include scheduling information of the UL frame determined based on the training field.

Communication efficiency can be enhanced by receiving a plurality of frames from a plurality of STAs on overlapped time resources.

BRIEF DESCRIPTION OF THE DRAWINGS

FIG. 1 is a conceptual diagram showing the configuration of a wireless local area network (WLAN).

DESCRIPTION OF EXEMPLARY EMBODIMENTS

FIG. 1 is a conceptual diagram illustrating the configuration of a wireless local area network (WLAN).

An upper portion of FIG. 1 shows the structure of the institute of electrical and electronic engineers (IEEE) 802.11 infrastructure network.

Referring to the upper portion of FIG. 1, the WLAN system may include one or more basic service sets (BSSs) 100 and 105. The BSS 100 or 105 is a set of APs, such as an access point (AP) 125 and an STA, such as the station1 (STA1) 100-1 that may be successfully synchronized with each other in order to communicate with each other and is not a concept indicative of a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected through the distribution system 110. The APs included in one ESS 140 may have the same service set identification (SSID).

The portal 120 may function as a bridge that performs connection of the WLAN network (IEEE 802.11) with other network (e.g., 802.X).

In the infrastructure network as shown in the upper portion of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower portion of FIG. 1 is a conceptual diagram illustrating an independent BSS.

Referring to the lower portion of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms, such as a mobile terminal, a wireless device, a wireless send/receive unit (WTRU), user equipment (UE), a mobile station (MS) or a mobile subscriber unit, or may be simply referred to as a user.

Figure 2:
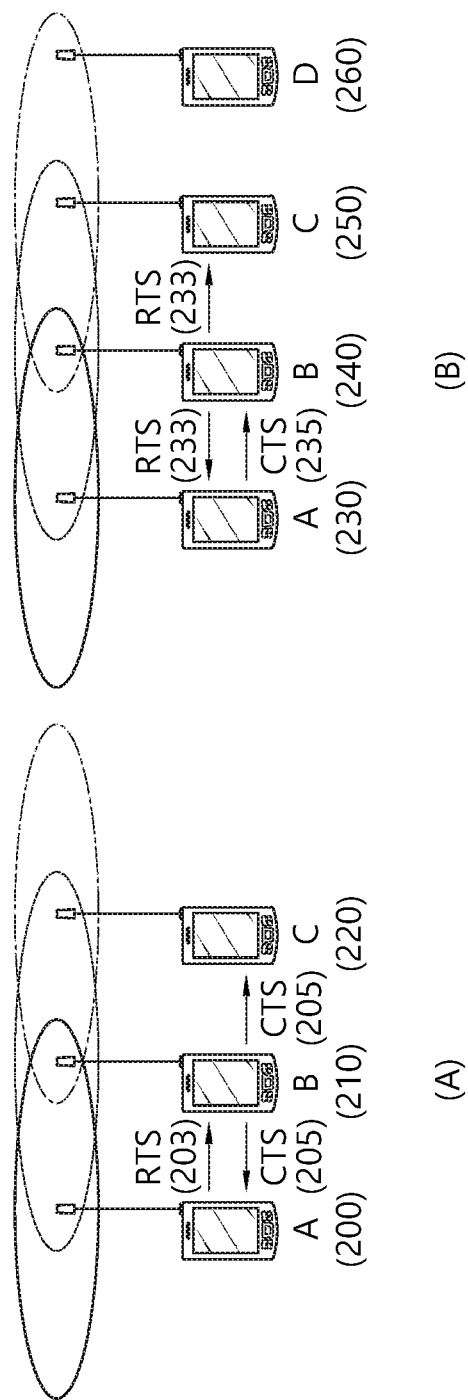
FIG. 2 is a conceptual diagram showing a method using an RTS frame and a CTS frame so as to solve a hidden node issue and an exposed node issue.

FIG. 2 is a conceptual view illustrating a method using a Request to Send (RTS) frame and a Clear to Send (CTS) frame in order to resolve a hidden node issue and an exposed node issue.

Referring to FIG. 2, a short signaling frame, such as an RTS frame and a CTS frame, may be used to solve the hidden node issue and the exposed node issue. Adjacent STAs may recognize based on the RTS frame and the CTS frame whether data transmission and reception is performed between two STAs.

FIG. 2(A) illustrates a method of transmitting an RTS frame 203 and a CTS frame 205 in order to solve the hidden node issue.

It may be assumed that both an STA A 200 and an STA C 220 intend to send data frames to an STAB 210. The STA A 200 sends the RTS frame 203 to the STAB 210 before transmitting a data frame, and the STA B 210 may send the CTS frame 205 to the STA A 200. The STA C 220 overhears the CTS frame 205 and recognizes that transmission of the frame is performed through a medium from the STA A 200 to the STA B 210. The STA C 220 may set a network allocation vector (NAV) until the STA A 200 terminates the transmission of the data frame to the STA B 210. If such a method is used, a collision attributable to a hidden node may be prevented between frames.

FIG. 2(B) illustrates a method of transmitting an RTS frame 233 and a CTS frame 235 in order to solve the exposed node issue The STA C 250 may determine whether a collision occurs when sending a frame to another an STA D 260 by monitoring the RTS frame 233 and the CTS frame 235 between the STA A 230 and the STAB 240.

The STA B 240 sends the RTS frame 233 to the STA A 230, and the STA A 230 may send the CTS frame 235 to the STA B 240. The STA C 250 overhears only the RTS frame 233 transmitted by the STA B 240 and does not overhear the CTS frame 235 transmitted by the STA A 230. Thus, the STA C 250 recognizes that the STA A 230 is out of the carrier sensing range of the STA C 250. Accordingly, the STA C 250 may send data to the STA D 260.

The format of the RTS frame and the format of the CTS frame are disclosed in the 8.3.1.2 RTS frame format and 8.3.1.3 CTS frame format of IEEE P802.11-REVmcTM/D2.0, October 2013.

Figure 3:
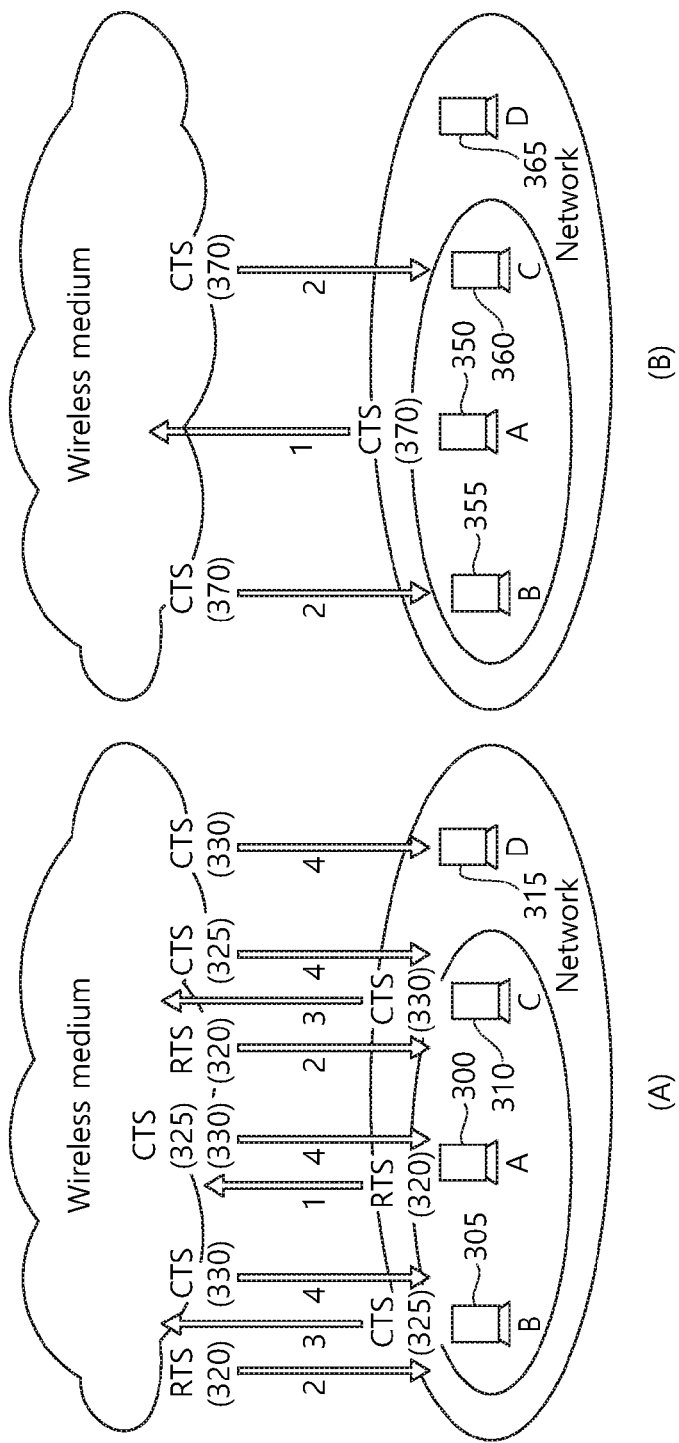
FIG. 3 is a conceptual diagram showing a CTS-to-Self mechanism.

FIG. 3 is a conceptual diagram showing a CTS-to-Self mechanism.

FIG. 3 shows a comparison between a case where a medium is sensed using an exchange method between an RTS frame and a CTS frame (FIG. 3(A)) and a case where a medium is sensed using a CTS-to-Self frame (FIG. 3(B)).

In the IEEE 802.11g standard, a CTS-to-Self protection mechanism was defined. The CTS-to-Self protection mechanism may be used instead of a medium sensing mechanism using an RTS frame and a CTS frame. If the CTS-to-Self protection mechanism is used, overhead for a medium can be reduced compared to the medium sensing mechanism using an RTS/CTS frame.

Referring to FIG. 3(A), a method for exchanging an RTS frame and a CTS frame before a transmission stage sends a data frame may be performed as follows.

In FIG. 3(A), it is assumed that an STA A 300 attempts to send a data frame to an STA B 305 or an STA C 310.

1) The STA A 300 sends an RTS frame 320.

2) The RTS frame 320 is received by the STA B 305 and the STA C 310 which are present in a carrier sensing range.

3) The STA B 305 and the STA C 310 send CTS frames 325 and 330.

4) The transmitted CTS frames 325 and 330 are transmitted to the STA A 300, the STA B 305, the STA C 310, and an STA D 315.

The STA D 315 has not received the RTS frame 320 transmitted by the STA A 300 because it is out of the carrier sensing range of the STA A 300 (i.e., the STA D 315 is a hidden node of the STA A 300). However, the STA D 315 may be aware that the STA A 300 has occupied a medium in order to send data by receiving the CTS frame 330 transmitted by the STA C 310. The STA D sets an NAV and may not access the medium.

5) The STA A 300 sends a data frame to the STA C 310.

Referring to FIG. 3(B), a medium sensing method based on a CTS-to-Self frame, which is performed before a transmission stage sends a data frame, may be performed as follows. In FIG. 3(B), it is assumed that an STA A 350 attempts to send a data frame to an STA C 360.

1) The STA A 350 sends a CTS-to-Self frame 370 to an STA B 355 and an STA C 360 which are present in a carrier sensing range.

2) The STA B 355 and the STA C 360 that have received the CTS-to-Self frame 370 delay the transmission of other data frames in order to receive a data frame transmitted by the STA A 350.

If such a method is used, an STA D 365 present out of the coverage of the STA A 350 does not receive the CTS-to-Self frame 370 from the STA A 350. Accordingly, the STA D 365 may be unaware of the transmission of a data frame by the STA A 350.

In such a case, when the STA D 365 sends a data frame to the STA A 350 or the STA C 360, a collision between the data frames may occur. That is, the method using the CTS-to-Self frame 370 cannot solve a hidden node problem. Accordingly, the method using the CTS-to-Self frame 370 is applied to a case where the transmission of data frames between STAs can be sensed. In other cases, a medium can be sensed using an RTS/CTS frame exchange method.

An access point (AP) operating in a wireless local area network (WLAN) system may send data to a plurality of stations (STAs) through the same time resources. If transmission from an AP to an STA is called DL transmission, such transmission of the AP may be expressed as a term called downlink multi-user transmission (DL MU transmission).

In an existing WLAN system, an AP could perform DL MU transmission based on multiple input multiple output (MU MIMO). Such transmission may be expressed as a term called DL MU MIMO transmission. In an embodiment of the present invention, an AP may perform DL MU transmission based on orthogonal frequency division multiplexing access (OFDMA). Such transmission may be expressed as a term called DL MU OFDMA transmission. If such DL MU OFDMA transmission is used, an AP may send a DL frame to each of a plurality of STAs through each of a plurality of frequency resources on overlapped time resources.

A PPDU, a frame, and data transmitted through DL transmission may be expressed as terms called a DL PPDU, a DL frame, and DL data, respectively. The PPDU may be a data unit including a PPDU header and a physical layer service data unit (PSDU) (or an MAC protocol data unit (MPDU)). The PPDU header may include a PHY header and a PHY preamble, and the PSDU (or MPDU) may include a frame or may indicate a frame.

In contrast, transmission from an STA to an AP may be called UL transmission. The transmission of data from a plurality of STAs to an AP on the same time resources may be expressed as a term called uplink multi-user transmission (UL MU transmission). Unlike in the existing WLAN systems, in a WLAN system according to an embodiment of the present invention, UL MU transmission may be supported. A PPDU, a frame, and data transmitted through UL transmission may be expressed as terms called an UL PPDU, an UL frame, and UL data, respectively. UL transmission by each of a plurality of STAs may be performed on a frequency domain or a spatial domain.

If UL transmission by each of a plurality of STAs is performed on a frequency domain, different frequency resources may be allocated to the plurality of STAs as UL transmission resources based on OFDMA. Each of the plurality of STAs may send an UL frame to an AP through the allocated different frequency resource. Such a transmission method through different frequency resources may also be expressed as a term called an UL MU OFDMA transmission method.

If UL transmission by each of a plurality of STAs is performed on a spatial domain, different time-space streams (or spatial streams) may be allocated to the plurality of STAs. Each of the plurality of STAs may send an UL frame to an AP through a different time-space stream. Such a transmission method through different spatial streams may also be expressed as a term called an UL MU MIMO transmission method.

Hereinafter, in an embodiment of the present invention, there is disclosed a medium protection method based on an RTS frame/CTS frame or an CTS-to-Self frame if UL MU transmission by a plurality of STAs is performed.

Each of a plurality of STAs may send an UL frame (an UL data frame, an UL management frame) on overlapped time resources based on UL MU transmission. Furthermore, if UL MU transmission is performed by a plurality of STAs, scheduling for the transmission of an UL frame may be performed an AP. For example, scheduling for UL MU transmission by an AP may be performed by an UL transmission indication frame (or a scheduling frame) transmitted from an AP to a plurality of STAs.

For example, each of a plurality of STAs that performs UL MU transmission may send an UL frame based on an UL transmission indication frame transmitted by an AP. Each of the plurality of STAs may receive the UL transmission indication frame from the AP, and may send an UL data frame to the AP after a specific time (e.g., a short interframe space (SIFS), an uplink interframe space (UIFS)). The SIFS is a value that may vary depending on the capability of an STA and a communication environment, but the ULFS may be a fixed value. If an interframe space is defined as a fixed value, a difference between pieces of reception timing of an AP with respect to a plurality of UL frames transmitted by a plurality of STAs may be a decodable range.

As described above, UL transmission by each of a plurality of STAs may be performed on a frequency domain (UL MU OFDMA transmission) or a spatial domain (UL MU MIMO transmission).

An UL transmission indication frame may include information for the UL transmission of a plurality of STAs. For example, the UL transmission indication frame may be used for each of STAs performing UL MU transmission to schedule information about resources to be used when it sends an UL frame. Furthermore, the UL transmission indication frame may include at least one of information indicative of each of a plurality of STAs or a group of a plurality of STAs which performs UL transmission, modulation and coding scheme (MCS) information used for the transmission of UL data by each of a plurality of STAs, information about the size of UL data which may be transmitted by each of a plurality of STAs, and information about transmission opportunity (TXOP) for UL transmission.

The size of UL data to be transmitted by each of a plurality of STAs and/or an MCS for the transmission of UL data to be transmitted by each of the plurality of STAs may be different. Accordingly, if a plurality of STAs sends valid (or meaningful) UL data through an UL frame, transmission duration of the UL frames transmitted by the plurality of STAs may be different. Accordingly, zero padding may be performed in order to identically set the transmission duration of the UL frame transmitted by the plurality of STAs based on an UL MU transmission method.

Alternatively, in order to increase the degree of freedom, if a plurality of STAs sends UL frames through different frequency resources based on OFDMA, transmission duration of the UL frames transmitted by the plurality of STAs may be differently set. In such a case, an AP may receive the UL frames by taking into consideration transmission timing of each of the plurality of UL frames, and may send a DL ACK frame to each of the plurality of STAs after an SIFS.

If such UL MU transmission is performed, a medium cannot be protected using an existing medium protection mechanism based on an RTS frame/CTS frame or a CTS-to-Self frame. Accordingly, there is a need for a new medium protection mechanism for UL MU transmission based on an existing RTS frame/CTS frame or CTS-to-Self frame.

An interframe space transmitted in a medium protection mechanism based on an RTS frame/CTS frame or an CTS-to-Self frame according to an embodiment of the present invention may be the same value as a short interframe space (SIFS), a distributed coordination function (DCF) interframe space (DIFS) or a point coordination function (PCF) interframe space (PIFS), and may be a specific fixed value (the aforementioned UIFS) predetermined for UL MU.

Figure 4:
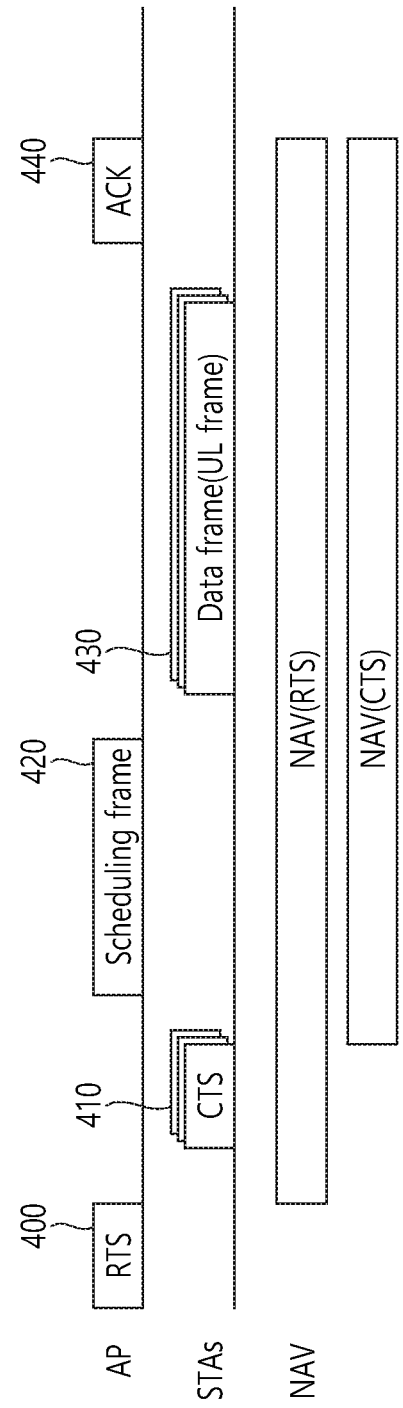
FIG. 4 is a conceptual diagram showing a medium protection method based on an RTS frame and a CTS frame in UL MU transmission according to an embodiment of the present invention.

FIG. 4 is a conceptual diagram showing a medium protection method based on an RTS frame and a CTS frame in UL MU transmission according to an embodiment of the present invention.

Referring to FIG. 4, in UL MU transmission, an RTS frame 400 may be transmitted from an AP that schedules UL MU transmission to a plurality of STAs. In a conventional technology, an STA that will send a data frame (or an management frame) sends an RTS frame. However, in UL MU transmission according to an embodiment of the present invention, the AP which schedules UL MU transmission and will receive a plurality of UL frames from the plurality of STAs may send the RTS frame 400.

The receiver address (RA) of the RTS frame 400 used in UL MU transmission may include information about transmission resources (UL MU transmission resource information) allocated to each of a plurality of STAs for UL MU transmission, information about the ID of each (or a primary STA) of a plurality of STAs (UL MU transmission STA information) which perform UL MU transmission, etc. That is, the RTS frame 400 used in UL MU transmission maintains the same format as an existing RTS frame for backward compatibility, but unlike an existing RTS frame, a specific field (e.g., an RA field) may include UL MU transmission STA information.

More specifically, the UL MU transmission STA information may include at least one of a partial identifier (ID) of a plurality of STAs (or a primary STA) that will perform UL MU transmission, the group ID of a plurality of STAs, the broadcast ID of a plurality of STAs, and the ID of a primary STA. The primary STA may be one predetermined STA of a plurality of STAs that performs UL MU transmission.

Information about transmission resources (UL MU transmission resource information) allocated to each of a plurality of STAs may include information about transmission resources that are used for each of the plurality of STAs to perform UL MU transmission. For example, if each of a plurality of STAs performs UL MU MIMO transmission, an RA field may include information about time-space streams that is to be used by each of a plurality of STAs upon UL MU transmission. If each of a plurality of STAs performs UL MU OFDMA transmission, an RA field may include information about frequency resources (subband) to be used by each of a plurality of STAs upon UL MU transmission.

The format of the RTS frame 400 for UL MU transmission is described later.

A non-target STA that has received the RTS frame 400 may set an NAV based on the duration field of the RTS frame 400. The NAV may be set by taking into consideration the reception of a CTS frame by an AP, the transmission of an UL transmission indication frame, the reception of a data frame and duration until the transmission of an ACK frame (or a block ACK). The non-target STA may be a surrounding STA that does not receive an instruction for UL MU transmission based on the RTS frame 400.

Each of a plurality of STAs (or one (a primary STA) of the plurality of STAs performing UL MU transmission) that performs UL MU transmission indicated by the RTS frame 400 may send a CTS frame 410 to the AP based on UL MU transmission.

The CTS frame 410 for UL MU transmission may have the same format (a legacy CTS frame) as the existing format for backward compatibility. The CTS frame 410 for UL MU transmission may also include an additional CTS frame according to an embodiment of the present invention.

In accordance with an embodiment of the present invention, an additional CTS frame (hereinafter referred to as an "addition CTS frame") is defined, and the addition CTS frame may be transmitted immediately after an "x" time after an existing CTS frame (hereinafter referred to as a "legacy CTS frame") is transmitted for backward compatibility. In this case, x may be greater than or equal to 0 us. If x is 0 us, the legacy CTS frame and the addition CTS frame may be frames that are continuously transmitted. In such a case, a legacy CTS PPDU carrying (or containing) the legacy CTS frame and an additional CTS PPDU carrying the addition CTS frame may be contiguous in time.

The additional CTS PPDU carrying the addition CTS frame may not include a legacy part (a legacy-short training field (L-STF), a legacy-long training field (L-LTF), and a legacy-signal (L-SIG) field). The additional CTS PPDU may include only an LTF (e.g., a high efficiency-long training field (HE-LFT) and a control field for the measurement of a channel status. The transmission resources of the LTF included in the additional CTS PPDU may be determined based on order of information about the IDs of a plurality of STAs included in the RA field of an RTS frame. The LTF of an additional CTS PPDU transmitted by each of a plurality of STAs may be used to decode control information transmitted by each of the plurality of STAs. The control field of the additional CTS PPDU may include the ID information of an STA (i.e., the AID of an STA) that has transmitted the additional CTS PPDU.

For example, the UL MU transmission STA information of the RA field of the RTS frame 400 may sequentially include the IDs (e.g., AIDs) of a plurality of STAs that performs UL MU transmission. It may be assumed that the RTS frame 400 including the RA field sequentially including the AIDs of STAs corresponding to an STA1 to an STA4, respectively, is transmitted and each of the STA1 to the STA4 sends an additional CTS PPDU as a response to the RTS frame 400.

Time resources, frequency resources, code resources, etc. that are used for the STA1 to the STA4 to send LTFs may be determined by a sequence in which the STA1 to the STA4 are indicated by the RA field.

Each of a plurality of STAs may send an addition CTS PPDU based on different time-space streams. For channel estimation for different time-space streams by each of the plurality of STAs, an LTF on the addition CTS PPDU may be transmitted based on time division multiplexing (TDM), frequency division multiplexing (FDM) or code division multiplexing (CDM). The LTF of the addition CTS PPDU transmitted by each of the plurality of STAs may be divided based on TDM/FDM/CDM. The addition CTS PPDU may additionally include a null symbol. The null symbol included in the addition CTS PPDU may earn the time for scheduling for the UL MU transmission of an AP after the addition CTS PPDU is received.

The non-target STA that has received the CTS frame 410 (the legacy CTS frame and/or the addition CTS frame) set an NAV and may not perform channel access.

The AP that has received the CTS frame 410 (the legacy CTS frame and/or the addition CTS frame) from the plurality of STAs (or the primary STA) performing UL MU transmission may send a frame for the scheduling of UL MU transmission. Hereinafter, the frame for the scheduling of UL MU transmission may be expressed as a term called an UL transmission indication frame (or scheduling frame) 420. An addition CTS PPDU includes a training field (e.g., a VHT LTF or an HE-LFT). The AP may determine channel status information determined based on the training field. The UL transmission indication frame transmitted by the AP may include the scheduling information of an UL frame determined based on the channel status information.

As described above, the UL transmission indication frame 420 may include information for the UL transmission of a plurality of STAs. For example, the UL transmission indication frame 420 may be used to schedule information about transmission resources for the transmission of the UL frame of each STA that performs UL MU transmission. Furthermore, the UL transmission indication frame 420 may include at least one of information indicative of each of a plurality of STAs or a group of a plurality of STAs that performs UL transmission, modulation and coding scheme (MCS) information used for the transmission of the UL data of each of a plurality of STAs, information about the size of UL data which may be transmitted by each of a plurality of STAs, and information about transmission opportunity (TXOP) for UL transmission.

Each of the plurality of STAs performing UL MU transmission may receive the UL transmission indication frame 420 and send an UL frame 430 to the AP. Each of the plurality of STAs may send the UL frame 430 through each allocated transmission resource.

The AP that has received the UL frame 430 from each of the plurality of STAs may send an ACK frame (or a block ACK frame) 440 for the UL frame 430 to the plurality of STAs. The ACK frame (or block ACK frame) 440 transmitted by the AP may indicate at least one UL frame that belongs to the plurality of UL frames 430 transmitted by the plurality of STAs and that has been successfully decoded.

Alternatively, the ACK frame (or block ACK frame) 440 transmitted by the AP may include an ACK signal for an UL frame that belongs to the plurality of UL frames 430 transmitted by the plurality of STAs and that has been successfully decoded and an NACK signal for an UL frame that belongs to the plurality of UL frames 430 transmitted by the plurality of STAs and that has not been successfully decoded.

The space between the frames (the RTS frame 400, the CTS frame 410, the UL transmission indication frame 420, the UL frame 430, and the ACK frame 440) disclosed in FIG. 4 may be any one of an SIFS, a DIFS, and a PIFS or may be a specific fixed value (UIFS) in which UL MU transmission has been determined. The interframe space (IFS) may be a different value. For example, the IFS between the CTS frame 410 and the RTS frame 400 may be an SIFS, and the IFS between the UL transmission indication frame 420 and the UL frame 430 may be a specific fixed value in which UL MU transmission has been determined.

Figure 5:
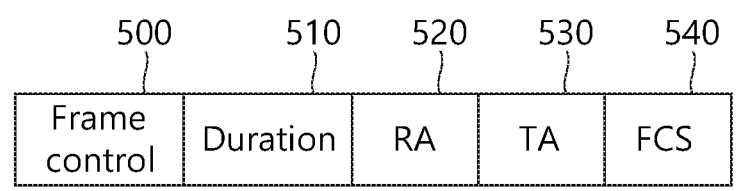
FIG. 5 is a conceptual diagram showing the format of an RTS frame according to an embodiment of the present invention.

FIG. 5 is a conceptual diagram showing the format of an RTS frame according to an embodiment of the present invention.

Referring to FIG. 5, the RTS frame may include a frame control field 500, a duration field 510, a receiver address (RA) field 520, a transmitter address (TA) field 530, and a frame check sequence (FCS) field 530.

The frame control field 500 may include information for indicating the RTS frame.

The duration field 510 may include duration information for the transmission of a CTS frame, an UL transmission indication frame, the UL frame of each of a plurality of STAs, and an ACK frame.

The RA field 520 may include UL MU transmission STA information and UL MU transmission resource information.

For example, the RA field 520 may be a field of 48 bits (6 octets). If a maximum of 4 STAs support UL MU transmission, 12 bits may be allocated to each STA. The 12 bits may correspond to the number of time-space streams (0-3 bits) (upon UL MU MIMO transmission) allocated to an STA performing UL MU transmission or the size (0-2 bits) of frequency resources (upon UL MU OFDMA transmission) allocated to an STA performing UL MU transmission, and the partial ID (9-10 bits) of an STA. More specifically, if a plurality of STAs performs UL MU MIMO transmission, the RA field may include information indicative of each of the plurality of STAs (the STA1, the STA2, the STA3, and the STA4) that will sequentially perform UL MU transmission and information about the number of time-space streams used by each of a plurality of STAs.

For example, the RA field 520 may sequentially include information about the ID of the STA1, the number of time-space streams allocated to the STA1, information about the ID of the STA2, the number of time-space streams allocated to the STA2, information about the ID of the STA3, the number of time-space streams allocated to the STA3, information about the ID of the STA4, and the number of time-space streams allocated to the STA4. Alternatively, the RA field may sequentially include information about the ID of the STA1, information about the ID of the STA2, information about the ID of the STA3, information about the ID of the STA4, and information about the number of time-space streams allocated to the STA1, the number of time-space streams allocated to the STA2, the number of time-space streams allocated to the STA3, and the number of time-space streams allocated to the STA4.

It may be assumed that two time-space streams are allocated to the STA1, one time-space stream is allocated to the STA2, three time-space streams are allocated to the STA3, and two time-space streams are allocated to the STA4 based on the RA field 520. In such a case, a time-space stream1 and a time-space stream2 may be allocated to the STA1, a time-space stream3 may be allocated to the STA2, a time-space stream4, a time-space stream5, and a time-space stream6 may be allocated to the STA3, and a time-space stream7 and a time-space stream8 may be allocated to the STA4.

That is, the plurality of time-space streams may be sequentially allocated to the plurality of STAs based on the number of time-space streams allocated to the plurality of STAs sequentially indicated based on the RA field 520.

The TA field 530 may include the address of the AP that sends the RTS frame.

The FCS field 530 may include information for checking the validity of the frame.

Figure 6:
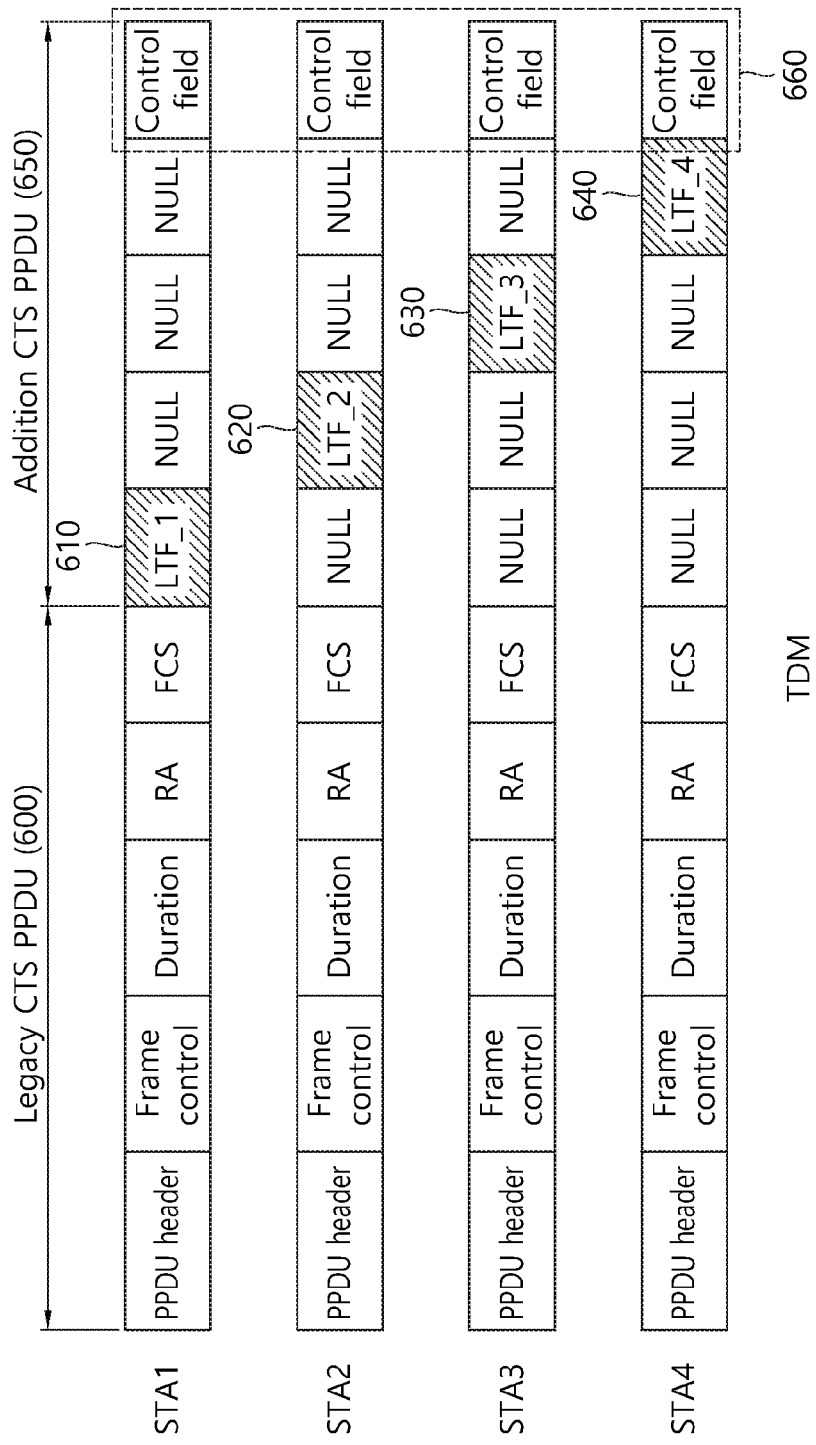
FIG. 6 is a conceptual diagram showing a legacy CTS PPDU and an additional CTS PPDU transmitted based on TDM according to an embodiment of the present invention.
Figure 7:
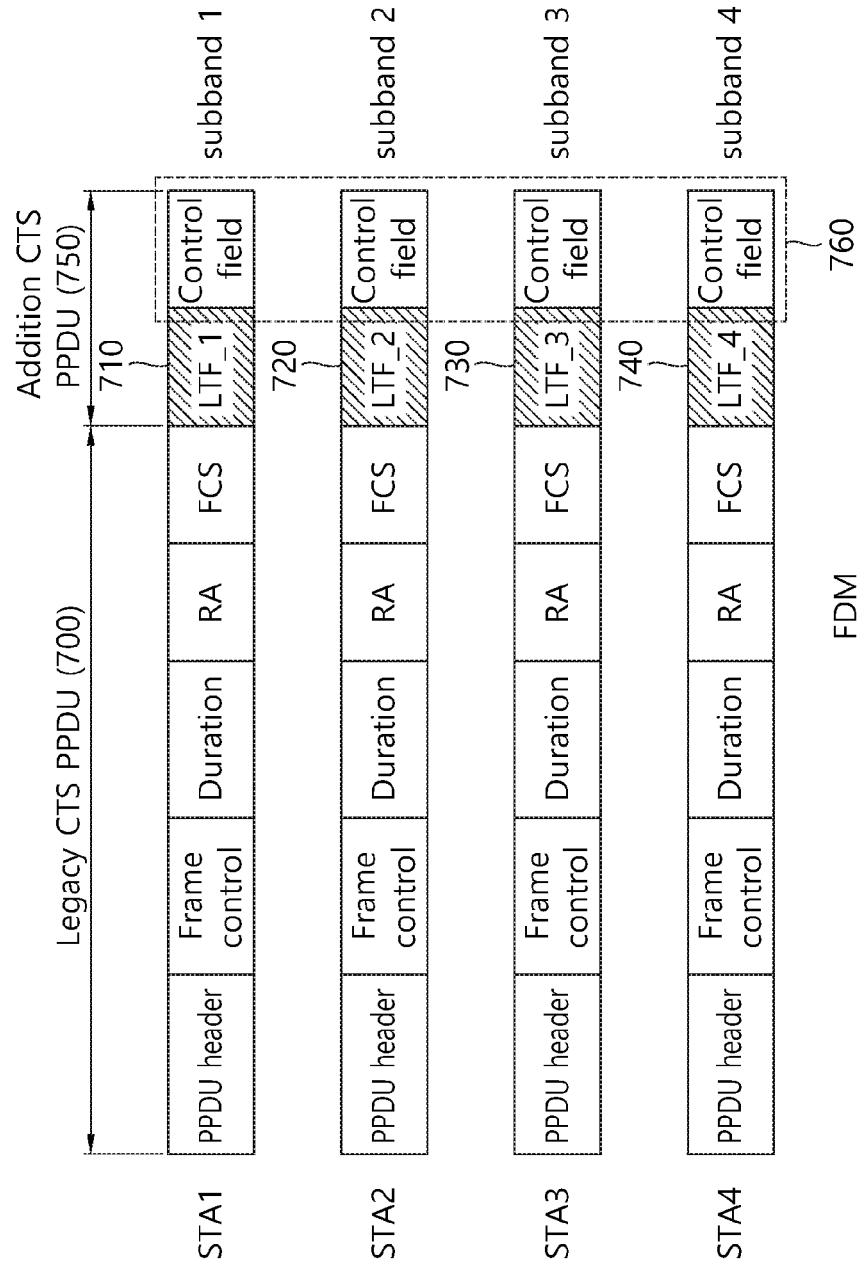
FIG. 7 is a conceptual diagram showing the format of a legacy CTS PPDU and the format of an additional CTS PPDU according to an embodiment of the present invention.
Figure 8:
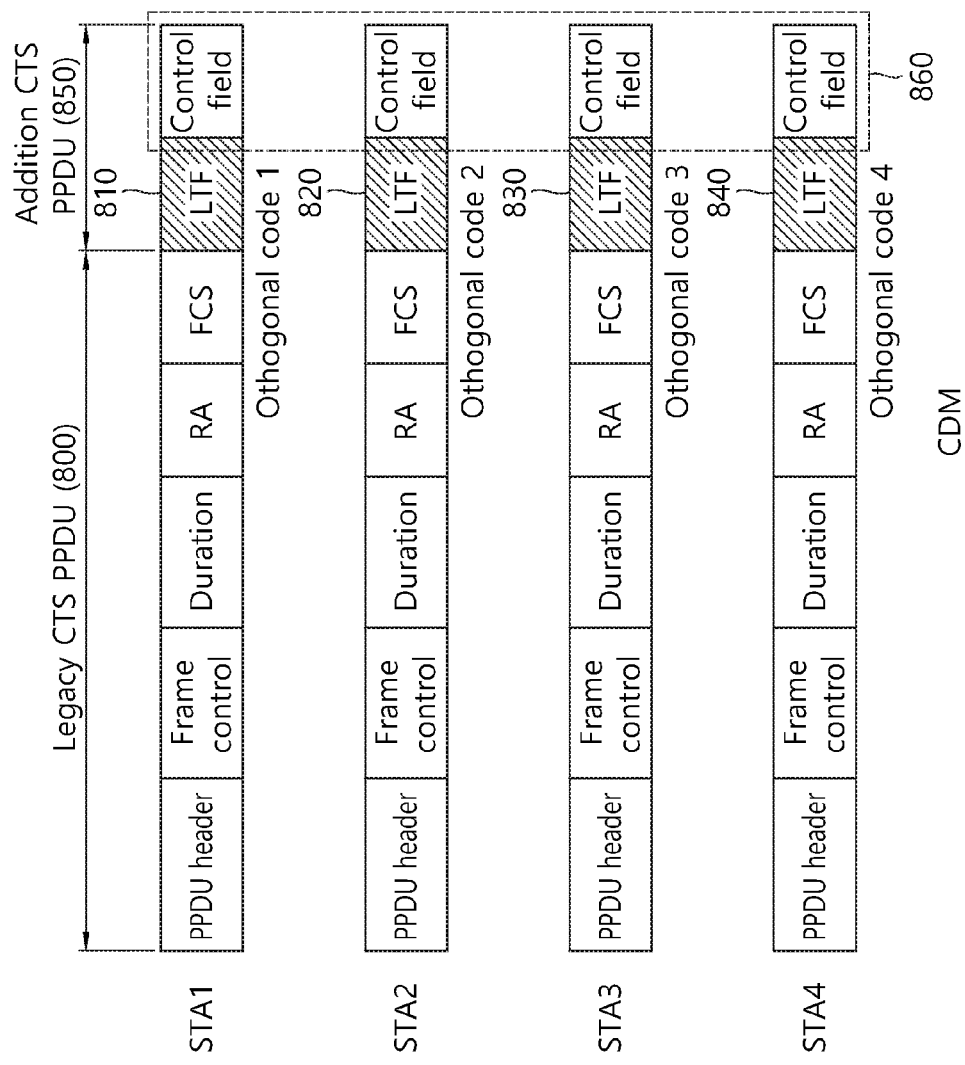
FIG. 8 is a conceptual diagram showing the format of a legacy CTS PPDU and the format of a transmitted additional CTS PPDU according to an embodiment of the present invention.

FIGS. 6 to 8 are conceptual diagrams showing the format of a legacy CTS PPDU and the format of an addition CTS PPDU according to an embodiment of the present invention. In FIGS. 6 to 8, for convenience sake, it is assumed that the legacy CTS PPDU and the addition CTS PPDU are continuously transmitted. However, as described above, the legacy CTS PPDU and the addition CTS PPDU may be discontinuously transmitted at a specific interval.

FIG. 6 is a conceptual diagram showing a legacy CTS PPDU and an addition CTS PPDU transmitted based on TDM according to an embodiment of the present invention.

Referring to FIG. 6, the legacy CTS PPDU 600 may include a PPDU header, a frame control field, a duration field, an RA field, and an FCS field.

The PPDU header may include a field for the interpretation of the legacy CTS frame depending on an implementation. Only a legacy part (an L-STF, an L-LTF, and an L-SIG) is included or both the legacy part and a non-legacy part may be included. The non-legacy part may include an additional training field and a signal field according to a PPDU format.

The frame control field may include information for indicating the CTS frame.

The duration field may include an UL transmission indication frame, an UL frame by each of a plurality of STAs, and duration information for the transmission of an ACK frame.

The RA field may include information about an AP that will receive the CTS frame.

The FCS field may include information for checking the validity of the frame.

Each of the legacy CTS PPDUs 600 transmitted by each of a plurality of STAs may be transmitted based on a duplicated format, and the legacy CTS PPDUs transmitted by the plurality of STAs may be the same.

Addition CTS PPDUs 650 transmitted by a plurality of STAs may be transmitted through different time-space streams.

The addition CTS PPDU 650 may include LTFs 610, 620, 630, and 640 and control fields 660.

Referring to FIG. 6, each of the LTFs 610, 620, 630, and 640 may be used for channel prediction for the decoding of the control field 660. The LTFs 610, 620, 630, and 640 may be transmitted based on a TDM method.

If the LTFs 610, 620, 630, and 640 are transmitted according to a TDM method, STAs may determine transmission timing (transmission time resources) of the LTFs according to order indicated based on an RTS frame. For example, it may be assumed that the RA field of an RTS frame sequentially indicates an STA 1, an STA2, an STA3, and an STA4. In such a case, when sending an addition CTS PPDU1, the STA1 may send the LTF1 610 on a first time resource. The STA1 may send null data on time resources (a second time resource to a fourth time resource) for the transmission of the LTFs of the remaining STAs.

When sending an addition CTS PPDU2, the STA2 may send the LTF2 620 on the second time resource. The STA2 may send null data on the time resources (the first time resource, the third time resource, and the fourth time resource) for the transmission of the LTFs of the remaining STAs.

When sending an addition CTS PPDU3, the STA3 may send the LTF3 630 on the third time resource. The STA3 may send null data on the time resources (the first time resource, the second time resource, and the fourth time resource) for the transmission of the LTFs of the remaining LTFs.

When sending a CTS PPDU4, the STA4 may send the LTF4 640 on the fourth time resource. The STA4 may send null data on the time resources (the first time resource, the second time resource, and the third time resource) for the transmission of the LTFs of the remaining LTFs.

Each of the control fields 660 of the respective STA1 to STA 4 may include information about the ID of each STA. Unlike in an existing CTS frame, information about the ID of an STA that sends an addition CTS PPDU may be included in the control field of an addition CTS PPDU transmitted by each of the STA1 to the STA 4. For example, the control field of the addition CTS PPDU1 transmitted by the STA1 may include information about the ID of the STA1, which indicates the STA1.

FIG. 7 is a conceptual diagram showing the format of a legacy CTS PPDU and the format of an addition CTS PPDU according to an embodiment of the present invention.

Referring to FIG. 7, the legacy CTS PPDU 700 may be transmitted based on a duplicated format as described above with reference to FIG. 6.

The LTFs 710, 720, 730, and 740 of an addition CTS PPDU 750 may be transmitted based on FDM. Information included in each field is the same as that described with reference to FIG. 6.

The LTF1 710 transmitted by an STA1 may be transmitted through a subband1. The LTF2 720 transmitted by an STA2 may be transmitted through a subband2. The LTF3 730 transmitted by an STA3 may be transmitted through a subband3. The LTFe4 740 transmitted by an STA4 may be transmitted through a subband4.

An AP may receive the LTF1 710 to the LTF4 740 from the STA1 to the STA4, respectively, through the different subbands.

Likewise, control fields 760 may be transmitted by the STA1 to the STA4, respectively, through the different subbands.

FIG. 8 is a conceptual diagram showing the format of a legacy CTS PPDU and the format of a transmitted addition CTS PPDU according to an embodiment of the present invention.

Referring to FIG. 8, the legacy CTS PPDU 800 may be transmitted based on a duplicated format as described above with reference to FIG. 6.

The LTFs 810, 820, 830, and 840 of an addition CTS PPDU 850 may be transmitted based on CDM. Information included in each of the fields is the same as that described with reference to FIG. 6.

The LTF1 810 transmitted by an STA1 may be transmitted based on orthogonal code 1. The LTF2 820 transmitted by an STA2 may be transmitted based on orthogonal code 2. The LTF3 830 transmitted by an STA3 may be transmitted based on orthogonal code 3. The LTF4 840 transmitted by an STA4 may be transmitted based on orthogonal code 4.

An AP may receive the LTF1 810 to the LTF4 840 from the STA1 to the STA4, respectively, based on the different orthogonal code.

Likewise, control fields 860 may be transmitted by the STA1 to the STA4, respectively, based on the different orthogonal code.

The PPDU transmission method based on TDM disclosed in FIG. 6, the PPDU transmission method based on FDM disclosed in FIG. 7, and the PPDU transmission method based on CDM disclosed in FIG. 8 may be mixed and used.

Figure 9:
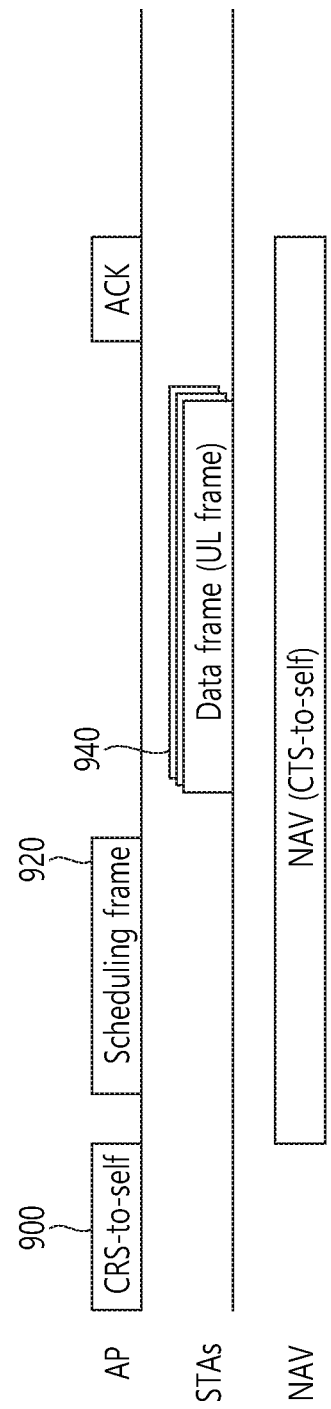
FIG. 9 is a conceptual diagram showing a medium protection method based on a CTS-to-Self frame in UL MU transmission according to an embodiment of the present invention.

FIG. 9 is a conceptual diagram showing a medium protection method based on a CTS-to-Self frame in UL MU transmission according to an embodiment of the present invention.

Referring to FIG. 9, an AP may send a CTS-to-Self frame 900 to STAs. The RA field of the CTS-to-S elf frame 900 may include the MAC address of an STA (or AP) that has sent the CTS-to-Self frame 900. In the case of FIG. 8, the RA field of the CTS-to-Self frame 900 transmitted by the AP may include the MAC address of the AP.

After sending the CTS-to-Self frame 900, the AP may send an UL transmission indication frame (or scheduling frame) 920. An interframe space between the CTS-to-Self frame 900 and the UL transmission indication frame 920 may be any one of an SIFS, a DIFS, and a PIFS or may be a specific fixed value (UIFS) in which UL MU transmission has been determined.

Each of the STAs may receive the UL transmission indication frame 920 and send an UL frame 940 to the AP.

Alternatively, a new CTS-to-Self frame for the UL MU transmission of a plurality of STAs may be defined. If a new CTS-to-Self frame is transmitted to the plurality of STAs that performs UL MU transmission, the transmission of the plurality of UL frames 940 by the plurality of STAs that performs UL MU transmission may be triggered without the transmission of the UL transmission indication frame 920. Such a new CTS-to-Self frame may be expressed as a term called an UL transmission indication CTS-to-Self frame.

The format of the UL transmission indication CTS-to-Self frame may be a format including an additional control field at the end of an existing CTS-to-Self frame. The control field of the UL transmission indication CTS-to-Self frame may include information for the UL transmission of the plurality of STAs. For example, the control field may include information for scheduling information about resources to be used when the UL frame 940 is transmitted by each of the STAs that perform UL MU transmission. Furthermore, the control field may include at least one of information indicative of each of a plurality of STAs or a group of a plurality of STAs that performs UL transmission, MCS information used for the transmission of the UL data of each of a plurality of STAs, information about the size of UL data which may be transmitted by each of a plurality of STAs, and information about TXOP for UL transmission.

Alternatively, the RA field of the UL transmission indication CTS-to-Self frame may include information about transmission resources (UL MU transmission resource information) allocated to each of a plurality of STAs for UL MU transmission, information about the ID of each of a plurality of STAs (or a primary STA) (UL MU transmission STA information) that performs UL MU transmission, and so on.

An UL transmission indication CTS-to-Self PPDU that carries the UL transmission indication CTS-to-Self frame may include an additional LTF for decoding the control field prior to the control field.

The format of such an UL transmission indication CTS-to-Self frame (or PPDU) is illustrative, and other various formats may be used as the format of a CTS-to-Self frame (or PPDU) for UL MU transmission.

If the UL transmission indication frame 920 is not transmitted and only an UL transmission indication CTS-to-Self frame (or PPDU) is transmitted, the time for sending the UL frames 940 of the plurality of STAs may be insufficient. Accordingly, the CTS-to-Self frame (or PPDU) may additionally include a dummy symbol (or a null symbol).

Figure 10:
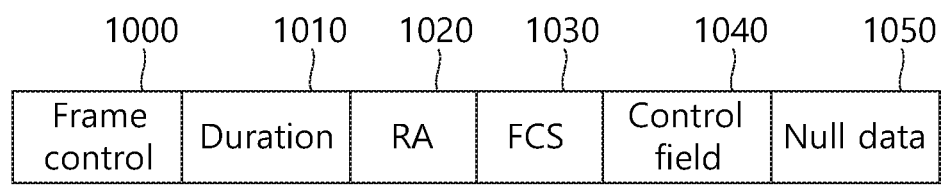
FIG. 10 is a conceptual diagram showing the format of an UL transmission indication CTS-to-Self frame according to an embodiment of the present invention.

FIG. 10 is a conceptual diagram showing the format of an UL transmission indication CTS-to-Self frame according to an embodiment of the present invention.

Referring to FIG. 10, the UL transmission indication CTS frame may include a frame control field 1000, a duration field 1010, an RA field 1020, an FCS field 1030, a control field 1040, and a null data field 1050.

The frame control field 1000 may include information for indicating the CTS frame.

The duration field 1010 may include duration information for the UL MU transmission of a plurality of STAs.

The RA field 1020 may include information about the ID of an AP that sends the UL transmission indication CTS frame or UL MU transmission STA information and UL MU transmission resource information like the aforementioned RA field of the RTS frame. If UL MU transmission STA information and UL MU transmission resource information are included in the RA field 1020, they may not be included in the control field 1040.

The FCS field 1030 may include information for checking the validity of the frame.

The control field 1040 may include information for the UL transmission of a plurality of STAs. For example, the control field may include information for scheduling information about resources to be used when each of STAs performing UL MU transmission sends an UL frame. Furthermore, the control field 1040 may include at least one of information indicative of each of a plurality of STAs or a group of a plurality of STAs that performs UL transmission, MCS information used for the transmission of the UL data of each of a plurality of STAs, information about the size of UL data which may be transmitted by each of a plurality of STAs, and information about TXOP for UL transmission.

The null data field 1050 may include null data.

Figure 11:
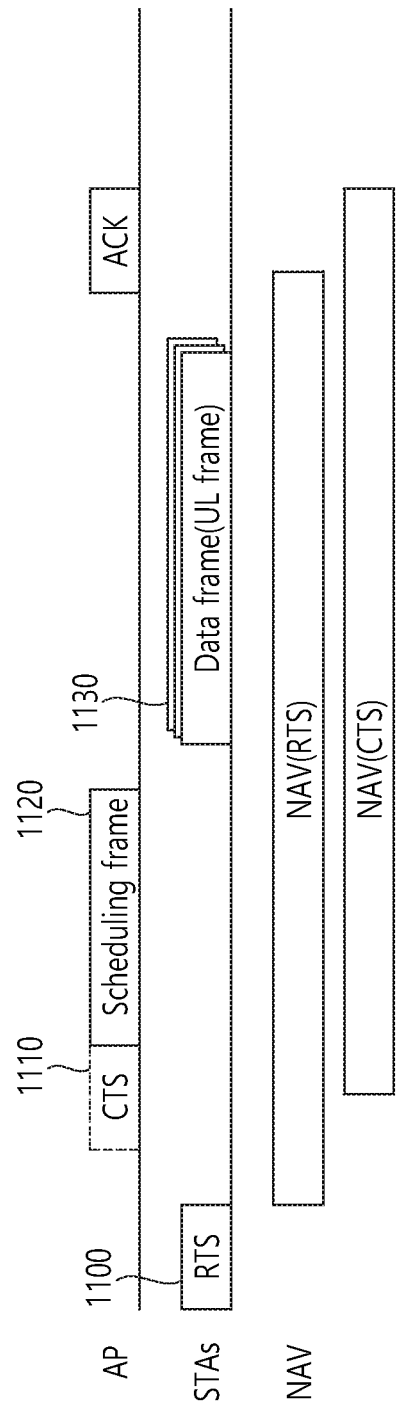
FIG. 11 is a conceptual diagram showing a medium protection method based on an RTS frame and a CTS frame in UL MU transmission according to an embodiment of the present invention.

FIG. 11 is a conceptual diagram showing a medium protection method based on an RTS frame and a CTS frame in UL MU transmission according to an embodiment of the present invention.

Referring to FIG. 11, one STA may send an RTS frame 1100 to an AP. The AP may receive UL frames based on UL MU transmission from a plurality of STAs including the STA that has sent the RTS frame 1100.

In order to receive the UL frames 1130 from the plurality of STAs, the AP may send a CTS frame 1110 and an UL transmission indication frame (or scheduling frame) 1120 to the plurality of STAs including the STA that has sent the RTS frame 1100.

The CTS frame 1110 and the UL transmission indication frame 1120 may be continuously transmitted or may be transmitted at a specific interframe.

Alternatively, the AP may trigger the UL MU transmission of the plurality of STAs by sending only the CTS frame without the transmission of an UL transmission indication frame based on an UL transmission indication CTS frame. The UL transmission indication CTS frame may have the same format as the UL transmission indication CTS-to-Self frame described with reference to FIG. 10. That is, the RA field or control field of the UL transmission indication CTS frame may include information for the UL transmission of the plurality of STAs.

As described above, the UL transmission indication CTS PPDU for carrying the UL transmission indication CTS frame may include an additional LTF for decoding a control field prior to the control field. If the UL MU transmission of the plurality of STAs is triggered based on the UL transmission indication CTS frame, a processing time for the UL transmission of the plurality of STAs may be insufficient. In order to prevent such a problem, the UL transmission indication CTS frame may further include an additional dummy symbol (or null symbol).

Alternatively, the AP may send only the UL transmission indication frame 1120 as a response to the RTS frame 1100 without sending the CTS frame 1110. The plurality of STAs may receive the UL transmission indication frame 1120 and perform UL MU transmission.

The UL MU transmission procedure disclosed in FIG. 11 has been triggered based on the RTS frame 1100 transmitted by one STA. In such a case, TXOP duration set based on the RTS frame 1100 may be a value determined by taking into consideration single user (SU) transmission.

Accordingly, if the AP triggers UL MU transmission, the TXOP duration set based on the RTS frame 1100 may be set again based on the CTS frame 1110 transmitted by the AP or an UL transmission indication CTS frame. If an STA not supporting UL MU transmission receives the CTS frame 1110, it may set an NAV for UL MU transmission. An STA supporting UL MU transmission may perform decoding on the scheduling frame or the UL transmission indication CTS frame 1110. If an STA does not receive an indication for the scheduling frame or the UL transmission indication CTS frame, it may set an NAV.

An STA that belongs to a plurality of STAs performing UL MU transmission indicated based on the scheduling frame 1120 or the UL transmission indication CTS frame and that has not been prepared to send the UL frame 1130 may not send the UL frame 1130 or may send the UL frame 1130 including dummy data.

The size of pended UL data and/or MCSs used for the transmission of UL data may be different in the plurality of STAs performing UL MU transmission disclosed in FIGS. 4 to 11. At least one of a plurality of STAs performing UL MU transmission may include dummy bits for synchronization with duration of a transmitted UL frame or may perform fragmentation on UL data.

Figure 12:
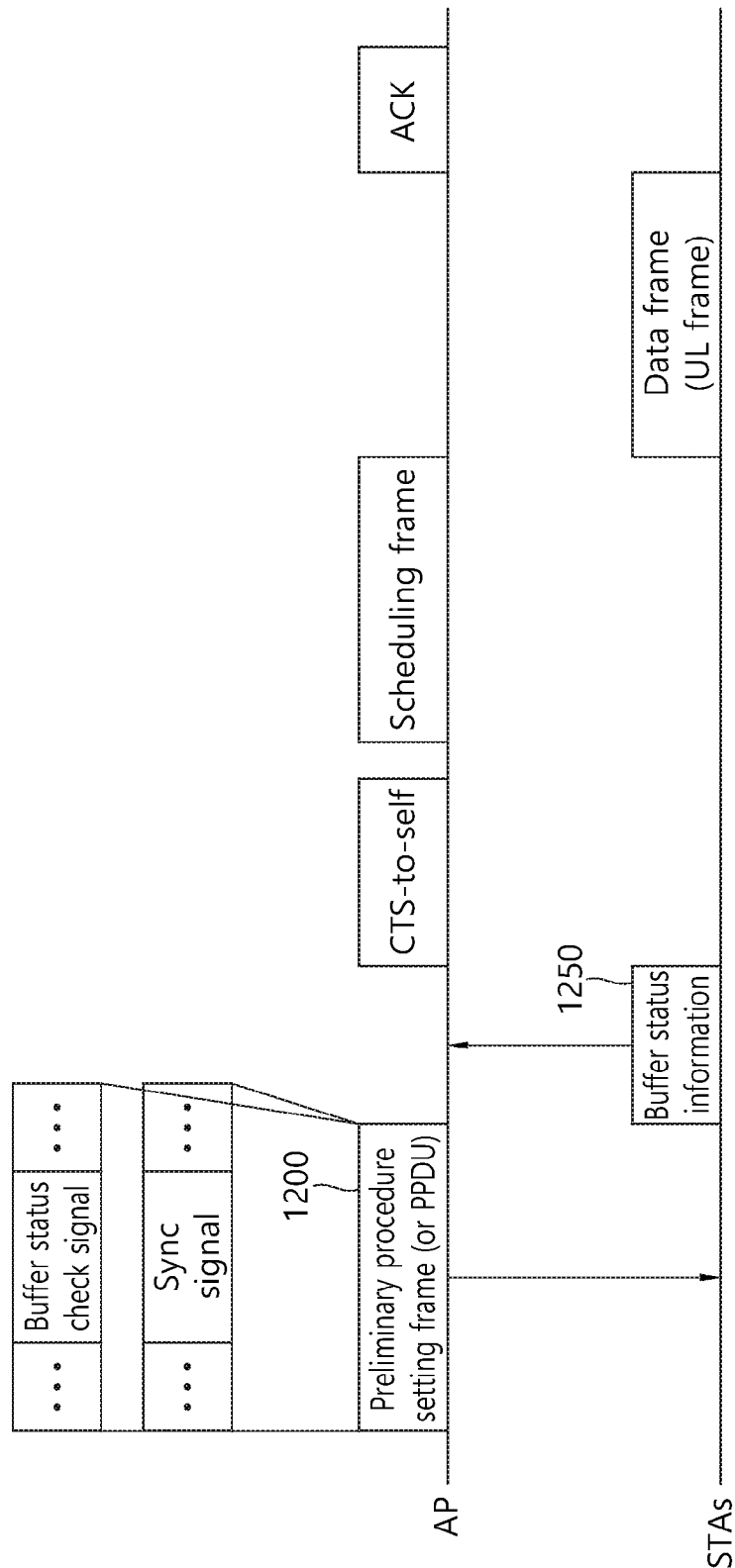
FIG. 12 is a conceptual diagram showing an UL MU transmission procedure according to an embodiment of the present invention.

FIG. 12 is a conceptual diagram showing an UL MU transmission procedure according to an embodiment of the present invention.

FIG. 12 discloses the transmission of an additional frame or PPDU for the UL MU transmission procedure based on an RTS frame and a CTS frame, the UL MU transmission procedure based on the UL transmission indication CTS-to-Self frame or the UL MU transmission procedure based on an UL transmission indication CTS frame disclosed in FIGS. 4 to 11. The additional frame or PPDU for UL MU transmission may be expressed as a term called a preliminary procedure setting frame (or preliminary procedure setting PPDU) 1200.

Referring to FIG. 12, the preliminary procedure setting frame (or the preliminary procedure setting PPDU) 1200 for UL MU transmission may include a sync signal for synchronization prior to the transmission of an UL transmission indication frame.

Alternatively, the preliminary procedure setting frame (or the preliminary procedure setting PPDU) 1200 for UL MU transmission may include a signal for a buffer status check or may include information for checking the channel status of a plurality of STAs performing UL MU transmission. If a preliminary procedure setting frame is transmitted, an STA may send buffer status information 1250 to an AP.

Alternatively, an additional frame or PPDU for UL MU transmission may include information for time correction, frequency correction, and power correction for the UL MU transmission of a plurality of STAs.

After the transmission of such a preliminary procedure setting frame (or PPDU) 1200, the UL MU transmission procedure based on an RTS frame/CTS frame disclosed in FIG. 4, the UL MU transmission procedure based on a CTS-to-Self frame disclosed in FIG. 9, and the UL MU transmission procedure based on an UL transmission indication CTS frame disclosed in FIG. 10 may be performed.

In FIG. 12, it is assumed that the UL MU transmission procedure based on a CTS-to-Self frame is performed after the preliminary procedure setting frame (or PPDU) 1200 is transmitted, for convenience sake of description.

A plurality of STAs sends UL frames to an AP based on UL MU transmission. The AP may send an ACK frame for the transmitted UL frames based on UL MU transmission.

In accordance with another embodiment of the present invention, such a preliminary procedure setting frame (or preliminary procedure setting PPDU) for UL MU transmission may be transmitted after the medium protection procedure based on an RTS frame and a CTS frame, the medium protection procedure based on an UL transmission indication CTS-to-Self frame or the medium protection procedure based on an UL transmission indication CTS frame. The preliminary procedure setting frame may be a frame for a preliminary procedure for UL MU transmission, such as a synchronization procedure, a buffer status check, and time/frequency/power correction procedure.

That is, the RTS frame and CTS frame, the UL transmission indication CTS-to-Self frame or the UL transmission indication CTS frame can protect a medium for the transmission of a preliminary procedure frame, scheduling frame, UL frame or ACK frame transmitted for UL MU transmission. Information about duration of the RTS frame and CTS frame, the UL transmission indication CTS-to-Self frame or the UL transmission indication CTS frame may be determined based on time resources for a frame transmitted or received in an UL MU transmission procedure, such as a preliminary procedure frame, scheduling frame, UL data, or ACK frame transmitted for UL MU transmission. A surrounding STA may set an NAV based on information about duration of the RTS frame and CTS frame, UL transmission indication CTS-to-Self frame or UL transmission indication CTS frame.

Figure 13:
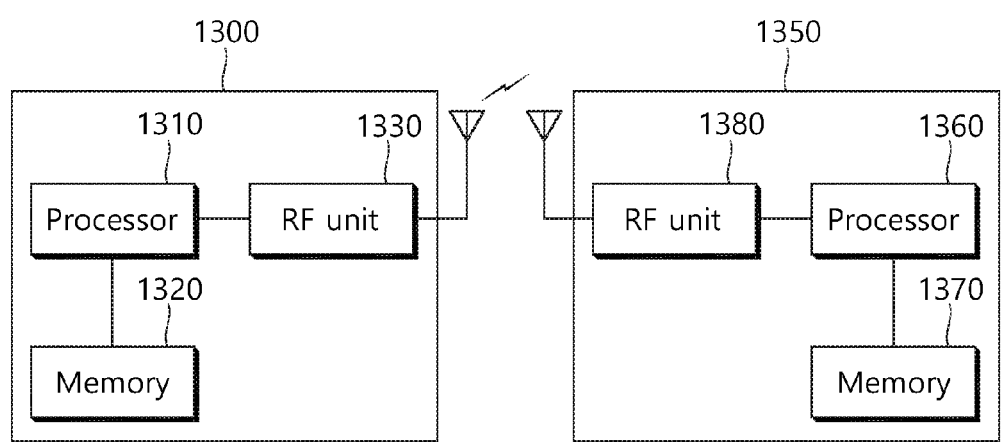
FIG. 13 is a block diagram showing a wireless device to which an embodiment of the present invention may be applied.

FIG. 13 is a block diagram showing a wireless device to which an embodiment of the present invention may be applied.

Referring to FIG. 13, the wireless apparatus 1300 is an STA capable of implementing the aforementioned embodiments and may be an AP 1300 or a non-AP station (or STA) 1350.

The AP 1300 includes a processor 1310, memory 1320, and a radio frequency (RF) unit 1330.

The RF unit 1330 is connected to the processor 1310 and may send/receive a radio signal.

The processor 1310 may implement the functions, processes and/or methods proposed by the present invention. For example, the processor 1310 may be implemented to perform the operations of the AP according to the aforementioned embodiments of the present invention. The processor may perform the operations of the AP disclosed in the embodiments of FIGS. 1 to 12.

For example, the processor 1310 may be implemented to send an RTS frame to a plurality of STAs. The RTS frame includes information for setting the network allocation vector (NAV) of another STA other than the plurality of STAs. The processor 1310 may be implemented to receive a CTS PPDU and an addition CTS PPDU on overlapped time resources from each of the plurality of STAs as a response to the RTS frame.

Furthermore, the processor 1310 may be implemented to send an UL transmission indication frame to a plurality of STAs. The UL transmission indication frame triggers the transmission of the UL frame of each of the plurality of STAs. The processor 1310 may be implemented to receive an UL frame on overlapped time resources from each of the plurality of STAs. The addition CTS PPDU may include a training field. The UL transmission indication frame may include scheduling information of the UL frame determined based on the training field.

The STA 1360 includes a processor 1360, memory 1370, and a radio frequency (RF) unit 1380.

The RF unit 1380 is connected to the processor 1360 and may send/receive a radio signal.

The processor 1360 may implement the functions, processes and/or methods proposed by the present invention. For example, the processor 1360 may be implemented to perform the operations of the STA according to the aforementioned embodiments of the present invention. The processor may perform the operations of the STA disclosed in the embodiments of FIGS. 1 to 10.

For example, the processor 1360 may be implemented to send a CTS frame (or CTS PPDU) and an addition CTS frame (or additional CTS PPDU) in response to an RTS frame received from an AP and to send an UL frame on transmission resources scheduled based on an UL transmission indication frame.

The processor 1310, 1360 may include application-specific integrated circuits (ASICs), other chipsets, logic circuits, data processors and/or converters for mutually converting baseband signals and radio signals. The memory 1320, 1370 may include read-only memory (ROM), random access memory (RAM), flash memory, memory cards, storage media and/or other storage devices. The RF unit 1330, 1380 may include one or more antennas for sending and/or receiving a radio signal.

When an embodiment is implemented in software, the aforementioned scheme may be implemented in the form of a module (process or function) for performing the aforementioned function. The module may be stored in the memory 1320, 1370 and executed by the processor 1310, 1360. The memory 1320, 1370 may be placed inside or outside the processor 1310, 1360 and may be connected to the processor 1310, 1360 by various well-known means.

What is claimed is:

1. A method for receiving a frame in a wireless local area network (WLAN), the method comprising:

transmitting, by an access point (AP) to a plurality of stations (STAs), a multi-user request to send (MU RTS), wherein the MU RTS frame includes identification information including a first identifier indicating a first STA and a second identifier indicating a second STA, and wherein the MU RTS frame further includes allocation information indicating a first frequency resource allocated to the first STA and a second frequency resource allocated to the second STA;

receiving, by the AP from the first STA according to the first frequency resource on a first time resource as a response to the MU RTS frame, a first legacy clear to send (CTS) physical layer protocol data unit (PPDU) and a first addition CTS PPDU that is appended to the first legacy CTS PPDU, wherein the first addition CTS PPDU includes a first control field including the first identifier and a first high efficiency-long training field (HE-LTF) that is used to decode the first control field;

receiving, by the AP from the second STA according to the second frequency resource on a second time resource that overlaps the first time resource as a response to the MU RTS frame, a second legacy CTS PPDU and a second addition CTS PPDU that is appended to the second legacy CTS PPDU, wherein the second addition CTS PPDU includes a second control field including the second identifier and a second HE-LTF that is used to decode the second control field;

transmitting, by the AP, an uplink (UL) transmission indication frame triggering a plurality of UL frames from the plurality of STAs, wherein the plurality of STAs correspond to the first STA and the second STA;

receiving, by the AP from the first STA according to the first frequency resource as a response to the UL transmission indication frame, a first UL frame on a third time resource; and receiving, by the AP from the second STA according to the second frequency resource as a response to the UL transmission indication frame, a second UL frame on a fourth time resource that overlaps the third time resource.

2. The method of claim 1, wherein the UL transmission indication frame includes the first identifier, the second identifier, first modulation and coding scheme (MCS) information used for the first UL frame, second MCS information used for the second UL frame, first size information on the first UL frame, and second size information on the second UL frame.

3. The method of claim 1, wherein remaining STAs other than the first STA and the second STA sets a network allocation vector (NAV) among the plurality of STAs.

4. An access point (AP) receiving a frame in a wireless local area network (WLAN), the AP comprising:

a radio frequency (RF) unit implemented to send and receive a radio signal; and a processor operatively connected to the RF unit, wherein the processor is implemented to:

transmit a multi-user request to send (MU RTS) frame to a plurality of stations (STAs), wherein the MU RTS frame includes identification information including a first identifier indicating a first STA and a second identifier indicating a second STA, and wherein the MU RTS frame further includes allocation information indicating a first frequency resource allocated to the first STA and a second frequency resource allocated to the second STA, receive, from the first STA according to the first frequency resource on a first time resource as a response to the MU RTS frame, a first legacy clear to send (CTS) physical layer protocol data unit (PPDU) and a first addition CTS PPDU that is appended to the first legacy CTS PPDU, wherein the first addition CTS PPDU includes a first control field including the first identifier and a first high efficiency-long training field (HE-LTF) that is used to decode the first control field, receive, from the second STA according to the second frequency resource on a second time resource that overlaps the first time resource as a response to the MU RTS frame, a second legacy CTS PPDU and a second addition CTS PPDU that is appended to the second legacy CTS PPDU, wherein the second addition CTS PPDU includes a second control field including the second identifier and a second HE-LTF that is used to decode the second control field, transmit an uplink (UL) transmission indication frame triggering a plurality of UL frames from the plurality of STAs, wherein the plurality of STAs correspond to the first STA and the second STA, receive, from the first STA according to the first frequency resource as a response to the UL transmission indication frame, a first UL frame on a third time resource, and receive, from the second STA according to the second frequency resource as a response to the UL transmission indication frame, a second UL frame on a fourth time resource that overlaps the third time resource.

5. The AP of claim 4, wherein the UL transmission indication frame includes the first identifier, the second identifier, first modulation and coding scheme (MCS) information used for the first UL frame, second MCS information used for the second UL frame, first size information on the first UL frame, and second size information on the second UL frame.

6. The AP of claim 4, wherein remaining STAs other than the first STA and the second STA sets a network allocation vector (NAV) among the plurality of STAs.

* * * * *